United States Patent
Chang

(10) Patent No.: US 6,368,095 B1
(45) Date of Patent: Apr. 9, 2002

(54) INJECTION DRIVE MECHANISM FOR A SERVO INJECTION MOLDING MACHINE

(76) Inventor: Ying-Fu Chang, No. 726, Jieh Shou Road, Sec. 2, Pa Teh City, Taoyuan (TW)

( * ) Notice: Subject to any disclaimer, the term of this patent is extended or adjusted under 35 U.S.C. 154(b) by 0 days.

(21) Appl. No.: 09/589,030

(22) Filed: Jun. 6, 2000

(51) Int. Cl.<sup>7</sup> ............................................. B29C 45/54
(52) U.S. Cl. ...................................... 425/145; 425/542
(58) Field of Search ............................ 425/145, 149, 425/542

(56) References Cited

U.S. PATENT DOCUMENTS 4,693,676 A * 9/1987 Inaba .......................... 425/145
5,129,808 A * 7/1992 Watanabe et al. ........... 425/145

* cited by examiner

*Primary Examiner*—Tim Heitbrink
(74) *Attorney, Agent, or Firm*—Pro-Techtor International Services

(57) ABSTRACT

A servo injection molding machine includes an injection screw, a ball screw, and a spline shaft that are mounted along the same axis. The spline shaft and the injection screw are connected by a connecting seat. An injection servomotor drives an injection sleeve mounted to a side of an injection seat, which, in turn, makes a ball nut drive a ball screw to move rectilinearly. A metering servomotor drives the spline shaft on a feeding seat to rotate in a direction that is same as or different from that of the injection servomotor or to rotate at a speed the same or not the same as that of the injection servomotor, thereby controlling the spline shaft to rotate on site or move rectilinearly for performing injection.

9 Claims, 6 Drawing Sheets

INJECTION DRIVE MECHANISM FOR A SERVO INJECTION MOLDING MACHINE

BACKGROUND OF THE INVENTION

1. Field of the Invention

The present invention relates to an injection drive mechanism for a servo injection molding machine. The injection drive mechanism includes an injection screw, a ball screw, and a spline shaft that are mounted along the same axis. The injection drive mechanism further includes two motors that may operate at various output speeds and/or operate in the same direction or opposite directions for providing various injection operations.

2. Description of the Related Art

A typical injection molding machine is actuated by hydraulic control that has problems of considerable energy consumption, oil leakage, and slow response to speed control. A servo-controlled injection molding machine may obviate the above problems, yet it is very complicated, as different injection speed control, pressure maintaining, material feeding, backpressure, etc are involved. An injection molding machine must be capable of controlling ordinary-speed injection or high-speed injection, and in some cases must provide low-speed/high-pressure injection. When the molten plastic material enters a mold cavity, the temperature of the plastic material begins to lower and the plastic material begins to solidify and thus shrink. At this time, pressure maintaining is required, and plastic material is supplied into the mold cavity to obtain a product with a precisely formed shape. The plastic material that moves forward in a barrel is stirred (by rotational movement of an injection screw) and heated by frictional heat resulting from shear force in the barrel, thereby performing the feeding/melting procedure. Meanwhile, when the molten plastic material is piled up in the barrel for subsequent injection, the injection screw must be moved backward very slowly to perform the backpressure control procedure, which affects the quality of the product to be formed.

U.S. Pat. No. 5,129,808 issued to Watanabe et al. on Jul. 14, 1992 discloses a two-plate type injection apparatus comprising a front plate, a pusher plate, and a single motor to drive two ball screws for actuating the pusher plate and a metering motor as well as corresponding feeding elements. Nevertheless, there are five axes involved, including two axes for two ball screws, two axes for two linear guides, and an axis for an injection screw. As a result, it is extremely difficult to keep the five axes parallel to each other. Making the ball screws, linear guides, and the injection screw move synchronously and controlling the precision are also difficult to achieve. In addition, such a servo-injection apparatus is heavy, consumes driving energy, and is incapable of performing high-speed injection.

U.S. Pat. No. 4,693,676 issued to Inaba on Sep. 15, 1987 discloses a screw-rotating/injection mechanism of an injection molding machine, wherein the front base and rear base are stationary and the pressure plate is movable. A servomotor drives two ball screws for actuating the pressure plate to thereby move a screw shaft. The other servomotor drives the screw shaft to rotate for feeding. Such an injection mechanism still has the drawbacks of heavy weight, consumption of driving energy, difficulty in keep several active axes parallel to each other, and difficulty in achieving synchronous control.

SUMMARY OF THE INVENTION

It is an object of the present invention to provide a servo injection molding machine to solve the above-mentioned drawbacks.

The servo injection molding machine in accordance with the present invention includes an injection screw, a ball screw, and a spline shaft that are mounted along the same axis. The spline shaft and the injection screw are connected by a connecting seat. An injection servomotor drives an injection sleeve mounted to a side of an injection seat, which, in turn, makes a ball nut drive a ball screw to move rectilinearly. A metering servomotor drives a spline shaft on a feeding seat to rotate in a direction that is same as or different from that of the injection servomotor or to rotate at a speed the same or not the same as that of the injection servomotor, thereby controlling the spline shaft to rotate on site or move rectilinearly for performing injection.

When the injection servomotor rotates in a direction, the metering servomotor does not rotate such that injection at normal speed is provided. When the metering servomotor rotates in a reverse direction, injection at high speed is provided by means reverse relative rotations between the ball screw and the ball nut. When the injection servomotor rotates in the direction and the metering servomotor rotates slowly in the reverse direction, low-speed/high-pressure injection is provided. The injection servomotor and the metering servomotor may rotate in the same direction to increase the injection speed or rotate in opposite directions to reduce the injection speed. Further, the injection servomotor and the metering servomotor may rotate at the same speed or different speeds to achieve control of various speeds.

After injection, speed of the injection servomotor is reduced. At last, supply of electricity continues and the injection servomotor does not rotate. This maintains torque without operation such that pressure maintaining is achieved in the mold cavity.

When the injection servomotor does not operate, operation of the metering servomotor is sufficient to melt the plastic material.

When the injection servomotor is controlled to rotate at low speed in the reverse direction, and the metering servomotor keeps on rotating for feeding, the injection screw is moved backward slowly to achieve formation of backpressure.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
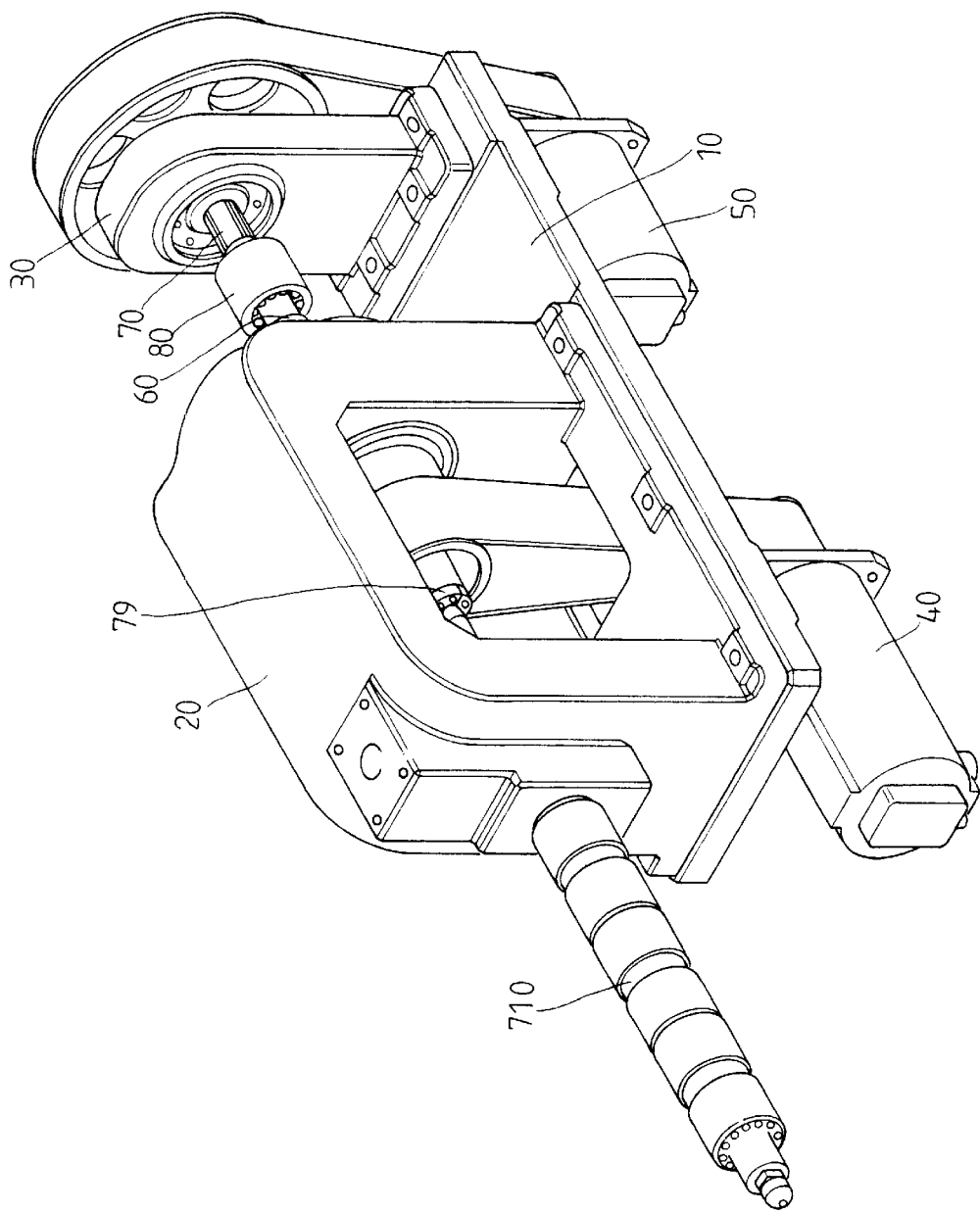
FIG. 1 is a perspective view of an injection drive mechanism for a servo injection molding machine in accordance with the present invention.

Referring to FIG. 1, an injection drive mechanism for a servo injection molding machine in accordance with the present invention generally includes a base 10 with an injection seat 20 and a feeding seat 30 mounted thereon. An injection servomotor 40 is mounted to an underside of the base 10 for driving a ball screw 60. Also mounted to the underside of the base 10 is a metering servomotor 50 for driving a spline shaft 70.

Figure 2:
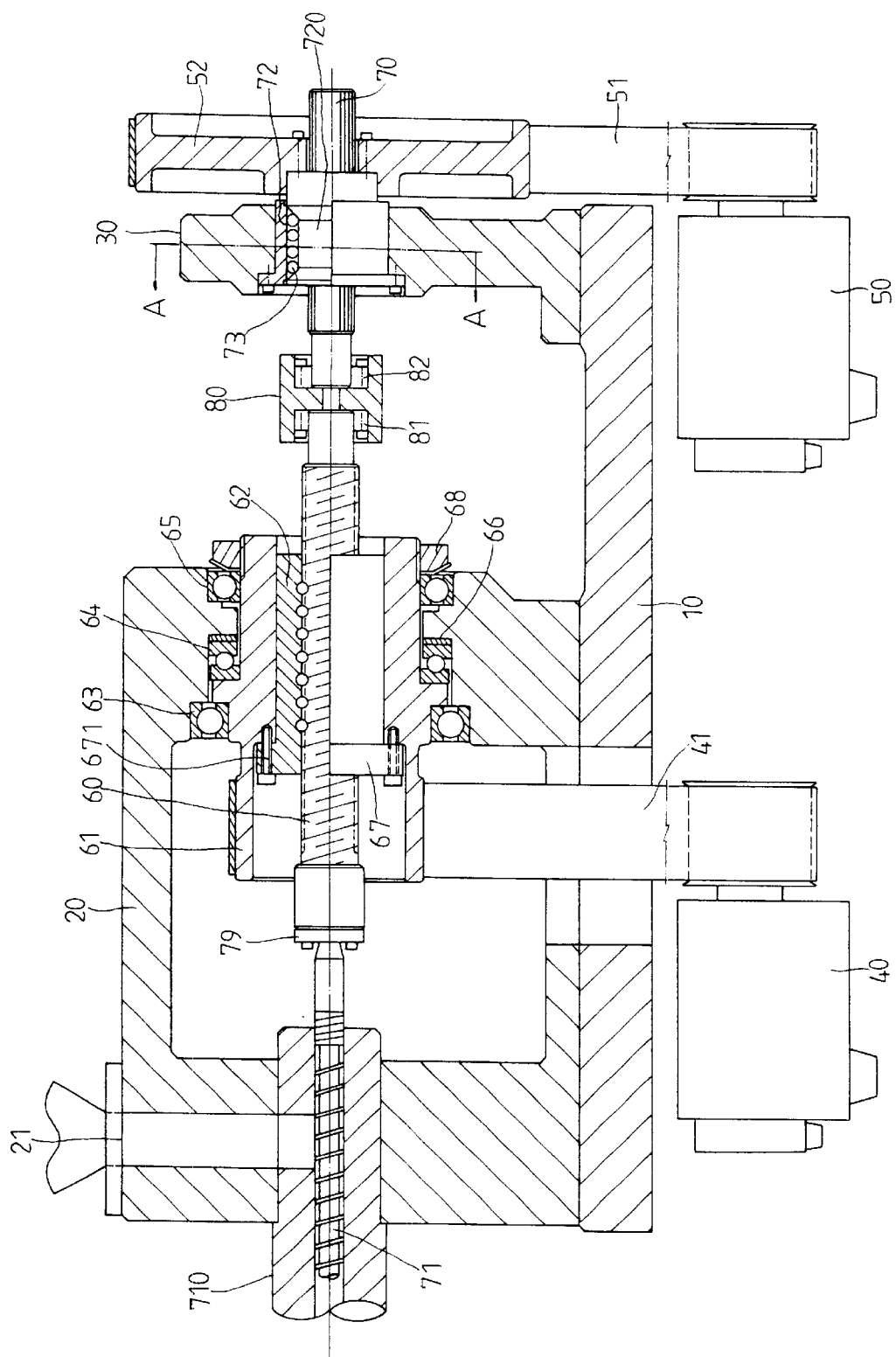
FIG. 2 is a longitudinal sectional view of the injection drive mechanism in accordance with the present invention.

Referring to FIGS. 1 and 2, a barrel 710 is mounted to a side (left side of FIG. 2) of the injection seat 20. The barrel 710 includes an injection screw 71 extending longitudinally therethrough. A feeding inlet 21 is defined in a top side of the injection seat 20 for supplying plastic material to the injection screw 71. Mounted to the other side (right side of FIG. 2) of the injection seat 20 is the ball screw 60 that has an axis coincident with that of the injection screw 71. As illustrated in FIG. 2, an end (left one in FIG. 2) of the ball screw 60 is connected with an end of the injection screw 71. The other end of the ball screw 60 is connected to an end of the spline shaft 70 via a connecting seat 80.

In this embodiment, the arrangement for positioning the ball screw 60 includes an injection sleeve 61 mounted therearound, the injection sleeve 61 being driven by the injection servomotor 40 via transmission by a timing belt 41. A ball nut 62 is mounted in the injection sleeve 61 and around the ball screw 60 to allow relative movement between the ball nut 62 and the ball screw 60. Between the injection seat 20 and the injection sleeve 61, a first deep groove bearing 63, a thrust bearing 64, and a second deep groove bearing 65 are provided in sequence. A projection 67 on an end of the ball nut 62 is engaged with a recessed portion (not shown) of the injection sleeve 61, and bolts 671 are provided to secure them together. The other end of the ball nut 62 is secured in place by a shaft-fastening nut 68. A load cell 66 is mounted to the thrust bearing 64.

Figure 5:
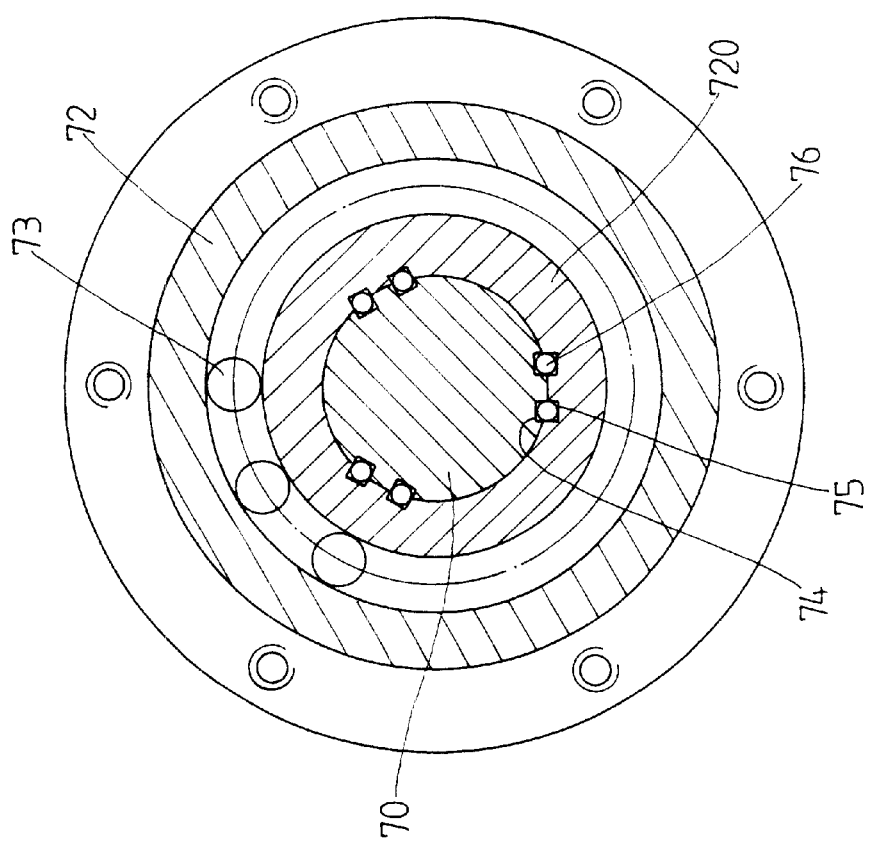
FIG. 5 is a sectional view taken along line A—A in FIG. 2.

As illustrated in FIG. 2, the spline shaft 70 is driven by the metering servomotor 50 via transmission of a timing belt 51, a belt wheel 52, and an inner lining 720. The spline shaft 70 and the belt wheel 52 do not contact with each other. The spline shaft 70 is mounted in the inner lining 720 (FIG. 5) in the feeding seat 30. As illustrated in FIG. 5, a plurality of annularly disposed balls 73 are provided between the outer lining 72 and the inner lining 720. Smaller balls 76 are disposed in splines 74 and 75 defined between the inner lining 720 and the spline shaft 70. The inner lining 720 and the belt wheel 52 are stationary for driving the spline shaft 70.

As mentioned above, the ball screw 60 and the spline shaft 70 are connected by the connecting seat 80. In this embodiment, a torque limit connector 81 is provided to the other end of the ball screw 60 for preventing damage to the injection mechanism due to overload, and another torque limit connector 82 is provided to the end of the spline shaft 70 to protect the feeding mechanism.

Figure 6:
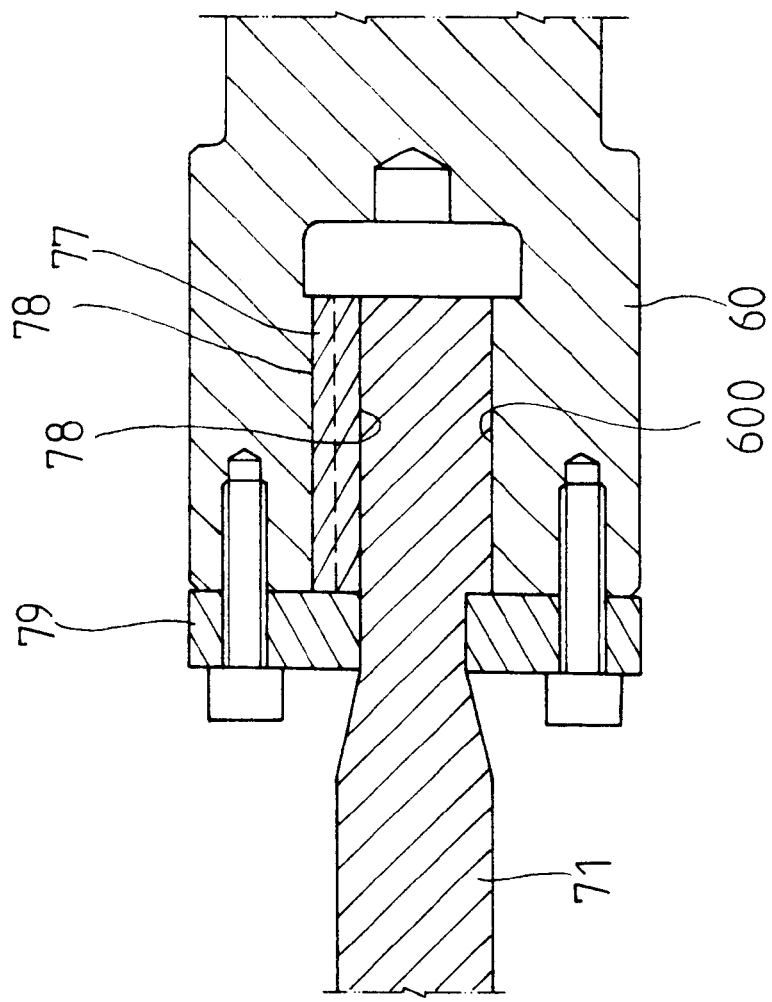
FIG. 6 is an enlarged sectional view illustrating connection between the injection screw and the ball screw in FIG. 2.

As illustrated in FIGS. 2 and 6, the other end of the injection screw 71 is extended into a receptacle 600 defined in the end of the ball screw 60. A key 77 is inserted into a spline 78, and a fastening member (in the form of two half members 79) is provided to secure the injection screw 71 and the ball screw 60 for joint rotation.

Figure 3:
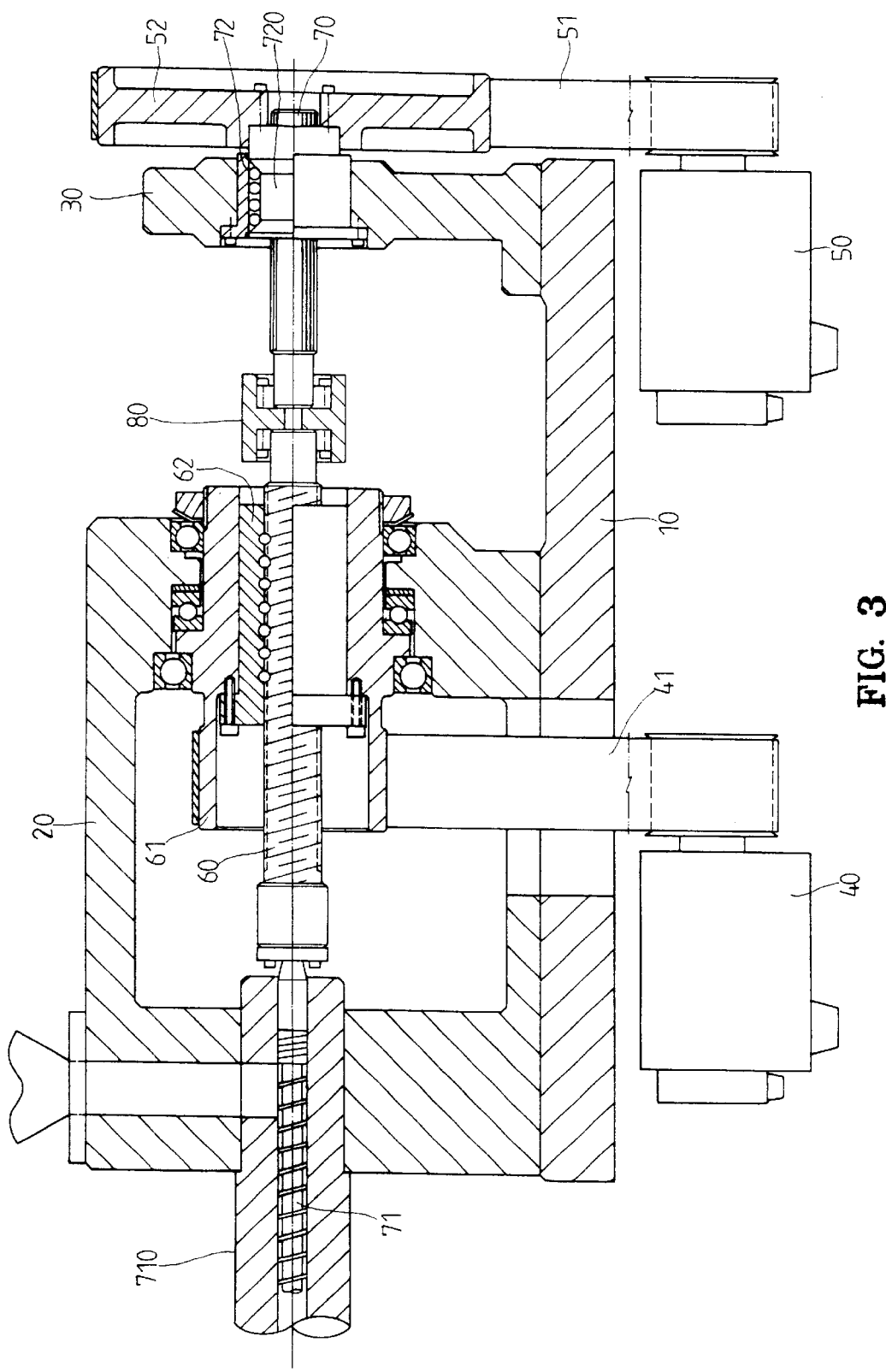
FIG. 3 is a sectional view similar to FIG. 2, wherein the ball screw is moved forward.
Figure 4:
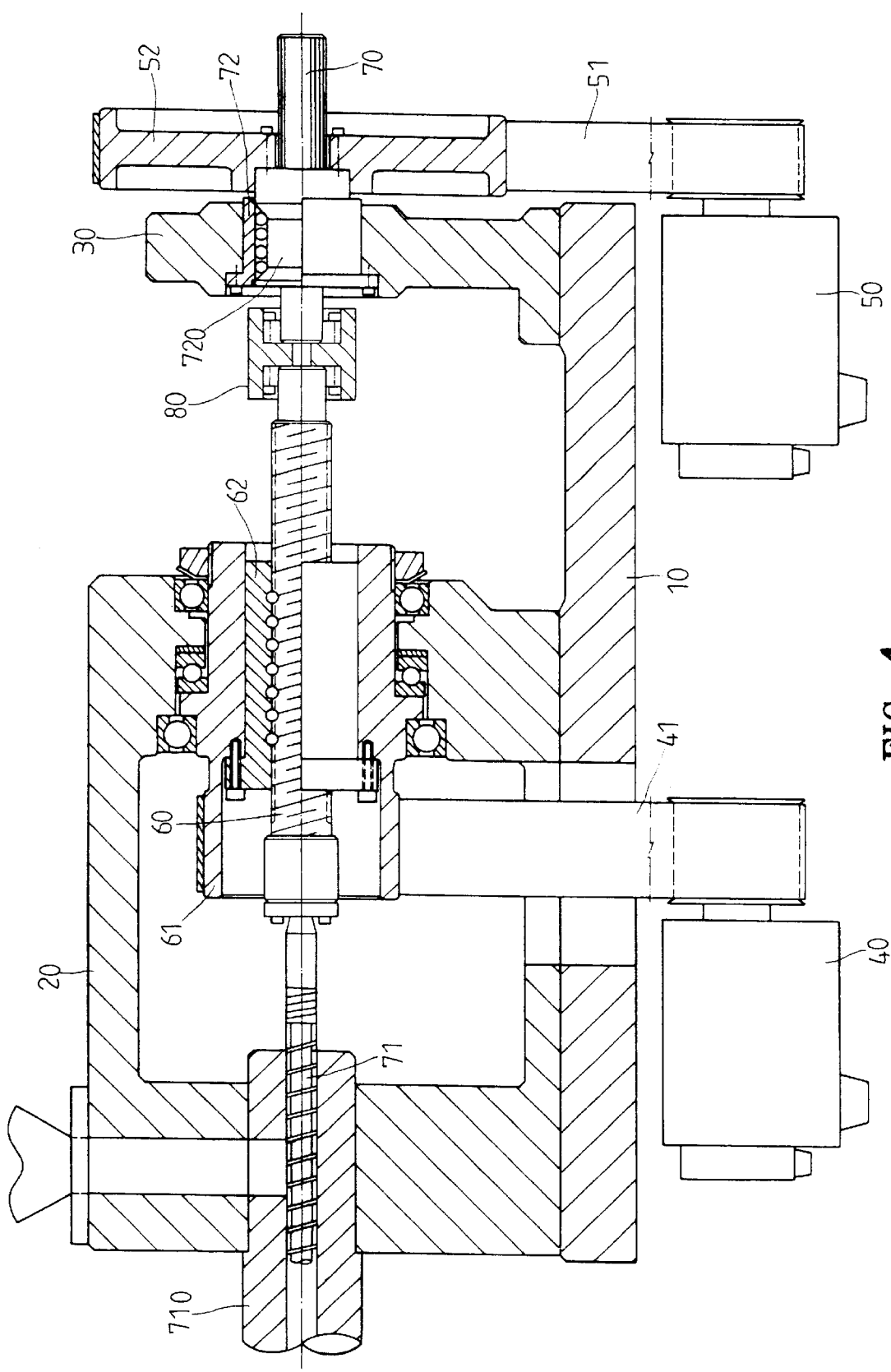
FIG. 4 is a sectional view similar to FIG. 2, wherein the ball screw is moved backward.

FIGS. 3 and 4 illustrate two action embodiments of the present invention. When performing normal speed injection, the injection servomotor 40 rotates in a direction (e.g., clockwise) to drive the ball nut 62 to turn. The injection screw 71 injects molten plastic into a mold cavity (not shown) at normal speed, as shown in FIG. 3. When the injection servomotor 40 rotates in a reverse direction (counterclockwise), the injection screw 60 is moved backward, as shown in FIG. 4.

When performing high-speed injection, the metering servomotor 50 rotates in a reverse direction (counterclockwise) while the injection servomotor 40 rotating in the clockwise direction. The inner lining 720 on the spline shaft 70 also rotates in the reverse direction to drive the ball screw 60 in the reverse direction and thus moves forward. Meanwhile, the ball nut 62 rotates in a direction opposite to that of the ball screw 60. As a result, the ball screw 60 and the ball nut 62 rotate in opposite directions to speed up locking or release such that the injection screw 71 injects molten plastic material into the mold cavity at high speed.

When the injection servomotor rotates in the above-mentioned direction and the metering servomotor rotates slowly in the reverse direction, the locking movement is slow for providing a low-speed/high-pressure injection.

After injection, speed of the injection servomotor is reduced. At last, supply of electricity continues and the injection servomotor does not rotate. This maintains torque without operation such that pressure maintaining is achieved in the mold cavity.

When the injection servomotor 40 does not operate, operation of the metering servomotor 50 is sufficient to melt the plastic material.

When the injection servomotor 40 rotates at low speed in the reverse direction, the ball screw 60 is moved backward slowly. At this time, the metering servomotor 50 keeps on rotating for feeding, the injection screw 71 is moved backward slowly to achieve the required backpressure effect.

The injection servomotor 40 and the metering servomotor 50 may rotate in the same direction to increase the injection speed or rotate in opposite directions to reduce the injection speed. Further, the injection servomotor 40 and the metering servomotor 50 may rotate at the same speed or different speeds to achieve control of various speeds.

Although the invention has been explained in relation to its preferred embodiment, it is to be understood that many other possible modifications and variations can be made without departing from the spirit and scope of the invention as hereinafter claimed.

What is claimed is:

1. An injection drive mechanism for a servo injection molding machine, comprising:

a base having an injection seat and a feeding seat mounted thereon, the injection seat having a first side and a second side, the base further including a top side with a feeding inlet;

a barrel mounted to the first side of the injection seat;

an injection screw rotatably extending through the barrel, the feeding inlet being adapted to allow feeding of plastic material to the injection screw;

a ball screw mounted to the second side of the injection seat, the ball screw including a first end that is connected with the injection screw and a second end, the ball screw including an axis that is coincident with that of the injection screw;

a spline shaft rotatably supported by the feeding seat, the spline shaft including an end connected to the second end of the ball screw, the spline shaft having an axis coincident with that of the ball screw;

an injection servomotor for driving the ball screw; and a metering servomotor for driving the spline shaft.

2. The injection drive mechanism for a servo injection molding machine as claimed in claim 1, wherein the ball screw includes an injection sleeve mounted therearound and driven by the injection servomotor via transmission of a timing belt, a ball nut being mounted in the injection sleeve and around the ball screw to allow relative movement between the ball nut and the ball screw.

3. The injection drive mechanism for a servo injection molding machine as claimed in claim 2, further comprising a first deep groove bearing, a thrust bearing, and a second deep groove bearing mounted between the injection seat and the injection sleeve in sequence.

4. The injection drive mechanism for a servo injection molding machine as claimed in claim 3, wherein the thrust bearing includes a load cell mounted thereto.

5. The injection drive mechanism for a servo injection molding machine as claimed in claim 2, wherein the ball nut includes an end with a protrusion for engaging with of the injection sleeve, further comprising a shaft-fastening nut for positioning the other end of the ball nut.

6. The injection drive mechanism for a servo injection molding machine as claimed in claim 1, wherein the feeding seat includes an outer lining mounted therein, an inner lining being mounted inside the outer lining, a plurality of annularly disposed balls being mounted between the inner lining and the outer lining, the spline shaft being mounted in the inner lining to rotate therewith.

7. The injection drive mechanism for a servo injection molding machine as claimed in claim 6, wherein the inner lining and the spline shaft include a plurality of splines defined therebetween, and a plurality of balls being mounted in the splines, respectively.

8. The injection drive mechanism for a servo injection molding machine as claimed in claim 7, wherein the inner lining includes an end connected to a belt wheel that is driven by the metering servomotor.

9. The injection drive mechanism for a servo injection molding machine as claimed in claim 1, wherein the ball screw and the spline shaft are connected by a connecting seat, further comprising a first torque connector connected to the second end of the ball screw, and a second torque connector connecting to the end of the spline shaft mounted in the connecting seat.

* * * * *